(12) United States Patent
Johnson

(10) Patent No.: US 11,510,041 B2
(45) Date of Patent: Nov. 22, 2022

(54) ACCESS TO BEACON NETWORKS BY OUTSIDE USERS

(71) Applicant: Geora LLC, Long Island City, NY (US)

(72) Inventor: Derrick Johnson, Long Island City, NY (US)

(73) Assignee: Geora LLC, Long Island City, NY (US)

( * ) Notice: Subject to any disclaimer, the term of this patent is extended or adjusted under 35 U.S.C. 154(b) by 0 days.

(21) Appl. No.: 17/155,206

(22) Filed: Jan. 22, 2021

(65) Prior Publication Data

US 2021/0235249 A1 Jul. 29, 2021

Related U.S. Application Data

(60) Provisional application No. 62/964,682, filed on Jan. 23, 2020.

(51) Int. Cl.
*H04W 4/80* (2018.01)
*H04W 4/08* (2009.01)
*H04W 4/12* (2009.01)

(52) U.S. Cl.
CPC .............. *H04W 4/80* (2018.02); *H04W 4/08* (2013.01); *H04W 4/12* (2013.01)

(58) Field of Classification Search
CPC combination set(s) only.
See application file for complete search history.

(56) References Cited

U.S. PATENT DOCUMENTS

| | | | | |
|---|---|---|---|---|
| 2002/0183004 | A1* | 12/2002 | Fulton | H04W 76/40 455/41.1 |
| 2014/0219118 | A1* | 8/2014 | Middleton | H04W 24/00 370/252 |
| 2014/0282620 | A1* | 9/2014 | Nuovo | G06F 16/24 719/318 |
| 2015/0287045 | A1* | 10/2015 | Brown | H04L 43/067 705/14.4 |
| 2016/0105761 | A1* | 4/2016 | Polo | H04W 4/80 455/41.2 |
| 2016/0371735 | A1* | 12/2016 | Walden | H04W 40/244 |
| 2017/0228776 | A1* | 8/2017 | Walden | G06Q 30/0273 |
| 2018/0109928 | A1* | 4/2018 | Walden | G06T 7/70 |
| 2019/0273777 | A1* | 9/2019 | Virani | H04L 67/18 |

* cited by examiner

*Primary Examiner* — David Bilodeau
(74) *Attorney, Agent, or Firm* — David J. Thibodeau, Jr.; VLP Law Group, LLP

(57) ABSTRACT

A user of a beacon message distribution service provides a specification for one or more messages to be sent to one or more beacon transmitters to a server. The specification may include at least content for the one or more messages and specification for where the messages are to be sent. The server then determines one or more beacon transmitters to receive the one or more messages based on the specification for where the messages are to be sent. A beacon manager or owner is also identified for the so determined one or more of the beacon transmitters.

6 Claims, 8 Drawing Sheets

ACCESS TO BEACON NETWORKS BY OUTSIDE USERS

CROSS-REFERENCE TO RELATED APPLICATION

This application claims priority to U.S. Provisional Application No. 62/964,682 filed Jan. 23, 2020 entitled, "ACCESS TO BEACON NETWORKS BY OUTSIDE USERS", the entire contents of which are hereby incorporated by reference.

BACKGROUND

Beacon devices are an increasingly popular way to deliver messages to mobile devices in specific locations. Various vendors manufacture compatible hardware transmitters—typically called beacon transmitters—that broadcast to nearby portable electronic devices typically using a class of Bluetooth Low Energy (BLE) wireless communication protocols. This technology enables smartphones, tablets and other devices to perform actions when in close proximity to a beacon transmitter.

A compatible application or operating system running on the mobile device detects a beacon identifier and other data sent with it to determine the device's physical location, or track customers, or trigger a location-based action on the mobile device such as a push notification, an advertisement related to the location, or a check-in on social media, or other actions.

SUMMARY

Described herein are new and improved ways to use beacon transmitters, including:
  opening up access to a wider range of users;
  time and location based activation;
  retention of beacon messages based on time or distance relevance; and
  augmenting beacon networks with television or other streaming media.

More particularly, a beacon message distribution service permits a user to specify one or more messages to be sent to one or more beacon transmitters. The specification may include at least content for the one or more messages and one or more locations where the messages are to be sent. The server then determines one or more beacon transmitters to receive the one or more messages based on the locations specified. A beacon manager or owner is also identified for the so determined one or more of the beacon transmitters.

When the user requesting access is a subscriber of the distribution service (also referred to as an internal user) associated with the beacon manager/owner, the messages are then forwarded to the beacon transmitters to be sent to end user devices, without obtaining permission from an administrative user associated with the beacon manager. However, when the user is an outside user who is not a direct subscriber of the service, permission from the administrative user associated with the beacon manager entity is first obtained before the messages are sent to the beacons.

The one or more beacon transmitters may include one or more Bluetooth LE, iBeacon, or Eddystone beacon transmitters or the like.

The beacon manager entity typically owns, manages, or controls physical access to selected beacons and uses the service to control which users have access to their beacons.

An inside user is typically a subscriber of the service and is employed by, working for, associated with, or otherwise authorized in advance by the beacon manager entity to access a beacon.

An outside user is someone other than an inside user.

The beacons may include distance beacons, configured to transmit information associated with a physical area, or time elapsed beacons, for transmitting information associated with a time. The time elapsed beacons may control the messages transmitted to have a retraction time based on a travel time from a respective physical location.

End user devices may be configured to retain and delete messages if the retention time has elapsed.

DETAILED DESCRIPTION OF A PREFERRED EMBODIMENT

Figure 1:
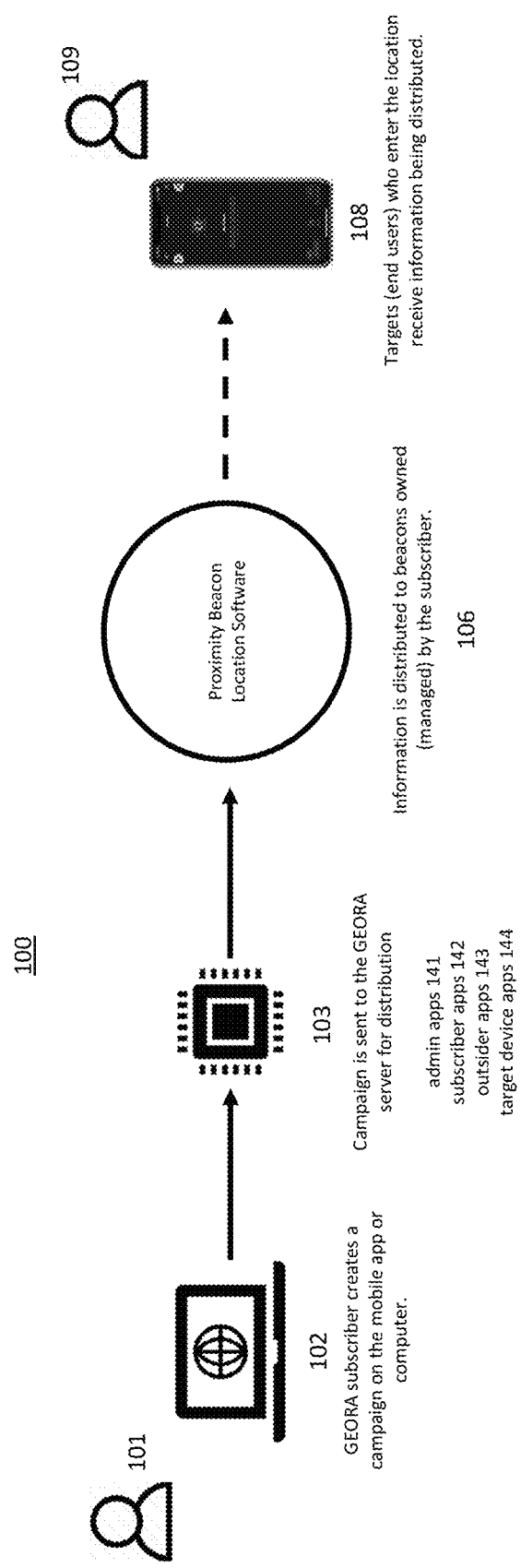
FIG. 1 is a high level diagram illustrating access to a network of beacons by a subscriber of a beacon management service.

An example beacon-based promotion distribution service called GEORA will now be explained in some detail. FIG. 1 illustrates a user 101 who subscribes to the distribution service 100. The subscriber user 101 uses their personal computer, laptop, tablet, mobile, smartphone, or other user computing device 102 to create or specify messages to be distributed (collectively referred to as messages herein). Via their device 102 they then accessing a GEORA server 103 to request distribution of the related messages to end user or target devices 108 which are typically beacon enabled mobile devices 108. FIG. 1 shows one such target device 108 accessed by a consumer (or end user 109 (such as person using a beacon-enabled smart phone 108).

The GEORA server 102 distributes the electronic messages, via one or more beacon transmitters 106, to the one or more target devices 108 via beacon transmitters 106. Beacon transmissions may include Bluetooth LE, iBeacon, Eddystone, etc. The range of such beacon transmissions may typically be from 1 to 150 meters.

Figure 2:
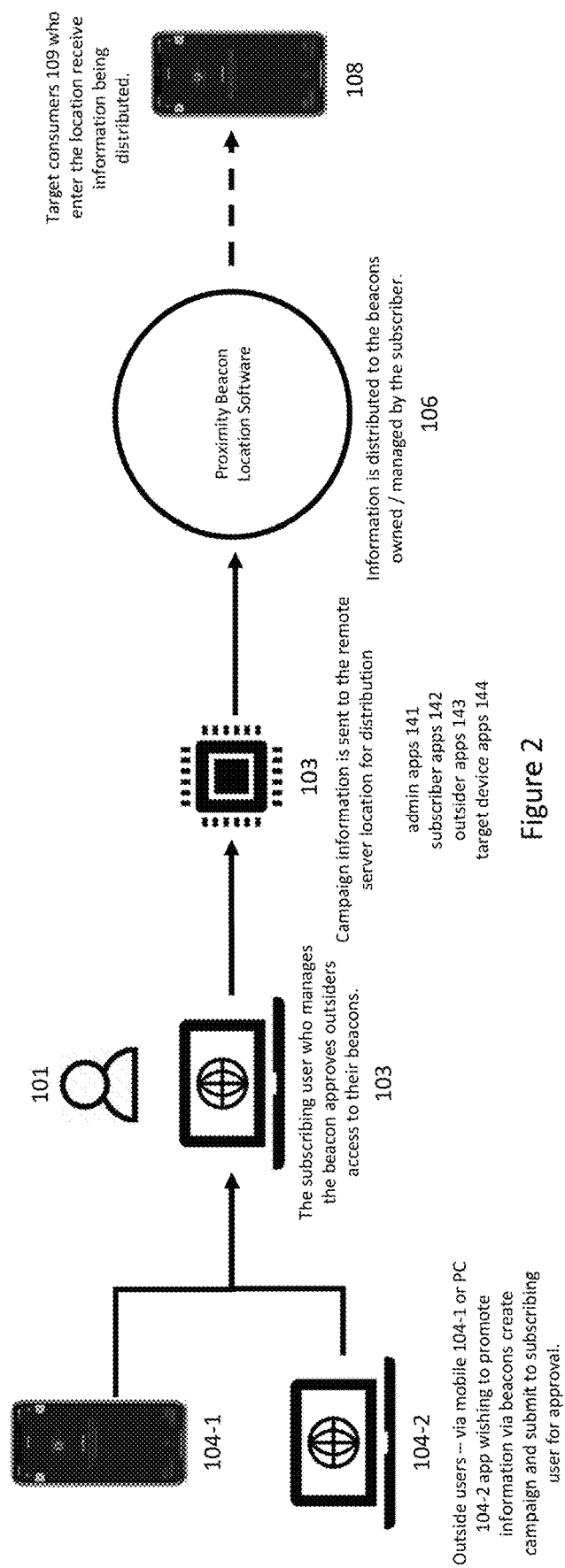
FIG. 2 is an example of how an outside user who is not a subscriber of the service may still access the beacons using the service, with permission of a subscribing user.

The GEORA server 103 stores, distributes and operates several different application software components including server side components that the GEORA server itself runs, and client side components that are executed by the user devices 102, 104, or 108. These components include administrative applications (apps) 141, subscriber user apps 142, outsider user apps 143, and target device apps 144. The administrative component 141, accessed by the operator of the GEORA service, is ultimately responsible for managing beacon message distribution for many different beacon owners ("customers" or "subscribers" of the GEORA service). A first type of customer-user level application 142 serves as the interface to users 101 who are the subscribers (beacon owners or managers), and another type of application component 143 serves as the interface to GEORA for another type of user, called "outside" users 104 (as shown in FIG. 2). Another component 144, as described below, operates on the target mobile devices 108.

More particularly, in the scenario depicted in FIG. 1, a subscriber user 101 using its respective subscriber user apps 142, specifies the content of one or more messages to be sent, and where the messages are to be sent. The specification for where the messages are to be sent can be made in several ways, such as by identifying specific beacon devices that should be enabled to broadcast the messages. However, the destination for messages can be specified in other ways, such as by identifying an area or location (such as a particular retail store) as described in more detail below.

This specification may be referred to as a campaign, and the messages may be promotions or other advertising messages. However, the same beacon messaging service 100 can be used to deliver other types of messages that are not advertisements or promotions. So long as the service 100 is given message content and a specification for where the messages are to be sent, it can deliver them.

In each scenario, the subscriber user's app 142 client side interacts with the corresponding server side component to create a campaign and then submit it for distribution. The GEORA server 103 administrative app 141 then manages the distribution of the campaign messages to one or more selected beacon transmitters 106.

Although FIG. 1 only shows a single beacon 106 location, the beacons may be located in various facilities such as retail stores, corporate offices, university campuses, public facilities, and the like. In one example, such facilities may include retail chain stores in three cities, such as Pittsburgh, Philadelphia, and Boston.

One or more of the GEORA server side apps may retain information about campaigns, such as in a database (not shown), including where and when such campaigns are to be or have been distributed.

In the example of FIG. 1, the user 101 is a subscriber of the service 100 and thus can be considered an "internal user" to the extent that they "own" the beacons 106 or are otherwise responsible to "manage" access to the beacons 106. "Ownership" is used herein in the sense that the user can control and/or manage access to the physical location where the beacons are installed even if they are not strictly legally owned by the particular user. In some instances, the subscriber user 101 is employed by, working with, or otherwise authorized by a legal entity who is the actual owner or manager of the beacons. Thus for the sake of convenience the subscriber user 101 is also sometimes referred to herein as the "beacon owner", with the understanding that they may not personally own the beacons 106 but may be employed by, working with, or otherwise have authorization to physically and/or electronically access a beacon 106. It should also be understood that an "entity" which "owns" and/or "manages" the beacons 106 may be an individual person or any of a variety of "organizations" such as a business, a corporation, an enterprise, an organization, a university, a community, a municipality, a city, etc.

FIG. 2 is a similar arrangement, but now the user is now a different type of person referred to as an "outside user" 104. The outside user 104 is someone other than a subscriber user 101 who is acting on behalf of or directly by the entity that "owns", manages or controls a beacon. The GEORA server 103 and outsider application 143 operate in much the same way for this type of outside user, to provide the same kind of access via the server 103 to deliver beacon messages to target mobile devices 108. Here, the difference is that access to the GEORA service 100 by the outside user 104 is first approved by an administrative user of the entity that owns or manages the beacons 106 to which the outsider 104 wants access.

The request process may be only somewhat automated (such as by the outsider 104 sending an email to the beacon owner). In other implementations, the approval process can be automatically managed by an administrative app 141 running on the GEORA server 103. For example, an outsider 104 submits their campaign using the outsider app 143, and then the subscriber user 101 uses their subscriber app 142 or the administrative app 141 to review and approve the particular campaign submitted by the outsider user 104.

Consider one example use case where a campaign is to be distributed to target devices located in three retail stores in Boston, Philadelphia and Pittsburgh. If the user submitting the campaign is an internal user 101 who owns, or who is affiliated with all three stores to which the messages are to be delivered, then no additional permission is required. However, an outside user 101 needs to obtain permission to distribute their message to the same beacons 106 in the same Philadelphia, Pittsburgh, and Boston stores. In another case where the subscriber user 101 only owns the beacons in the Boston store, she would be considered an outside user 101 and thus would need permission to distribute to the Pittsburgh and Philadelphia store.

It should also be understood that beacon locations may be other than retail stores owned or leased by the same entity that "owns" or "manages" the beacons. A beacon "owner" location might be a household, a museum, a municipal building, a city park, or any location controlled by someone who arranged to provide access to their beacons to outside users via the GEORA service 100.

A beacon owner (or manager) can thus use the GEORA service 100 to retain control over the messages travelling on his network of beacons 106. This permits the interface between the beacon owner and the GEORA service 100 to remain the same—just the source of campaign is different. To describe it a little bit differently, from top to bottom, a beacon owner (a subscriber of the GEORA service) obtains the ability to manage a certain number of beacons that he controls. The GEORA service 100 then enables this beacon owner to promote internally to her organization (e.g., with an unlimited number of messages to be sent by internal subscriber users 101) without further approval. But the GEORA service 100 can also be used to then provide limited controlled access by outside users 101.

Although FIGS. 1 and 2 shows distributing to a single beacon location, in many instances the location of a beacon may typically be a retail location store with multiple beacons in each store. In some arrangements where the beacon network is owned by a large "brick and mortar" retailer, there may be thousands of beacon devices in many diverse locations nationwide. Thus a typical large organization who is a user of the GEORA service 100 would own multiple physical locations with multiple beacons in each location. Distribution of messages to the different beacons in the different locations is still, in that situation, managed by the GEORA service 100.

The subscriber app 142, typically accessed by marketing personnel within a business or other organization, permits creating campaigns, approving campaigns, and managing beacons. The outside user application 143 can enable such a user to request access to the beacons owned by someone else, or provide and receive other information related to campaigns. For example, when an outside user 104 creates a campaign, a map may be displayed to her showing the businesses that make their beacons available through the GEORA service 100. The outside user 104 may then use their app 143 choose from that map where she wants the campaign to be sent. In some instances, the outside user may not be shown detailed information as to which specific beacons are open, or how management of the GEORA beacon system otherwise operates. In other words, this "outsider", "consumer-level" user may not care (or be allowed to control) exactly which businesses are going to be selected to deliver their campaign messages—only that they will be delivered in a particular area, or to a particular class of expected target end users. However, in other instances, the beacon owners, through their subscriber users 101, may allow more information about their beacon locations to be exposed to outside users 104.

Figure 3:
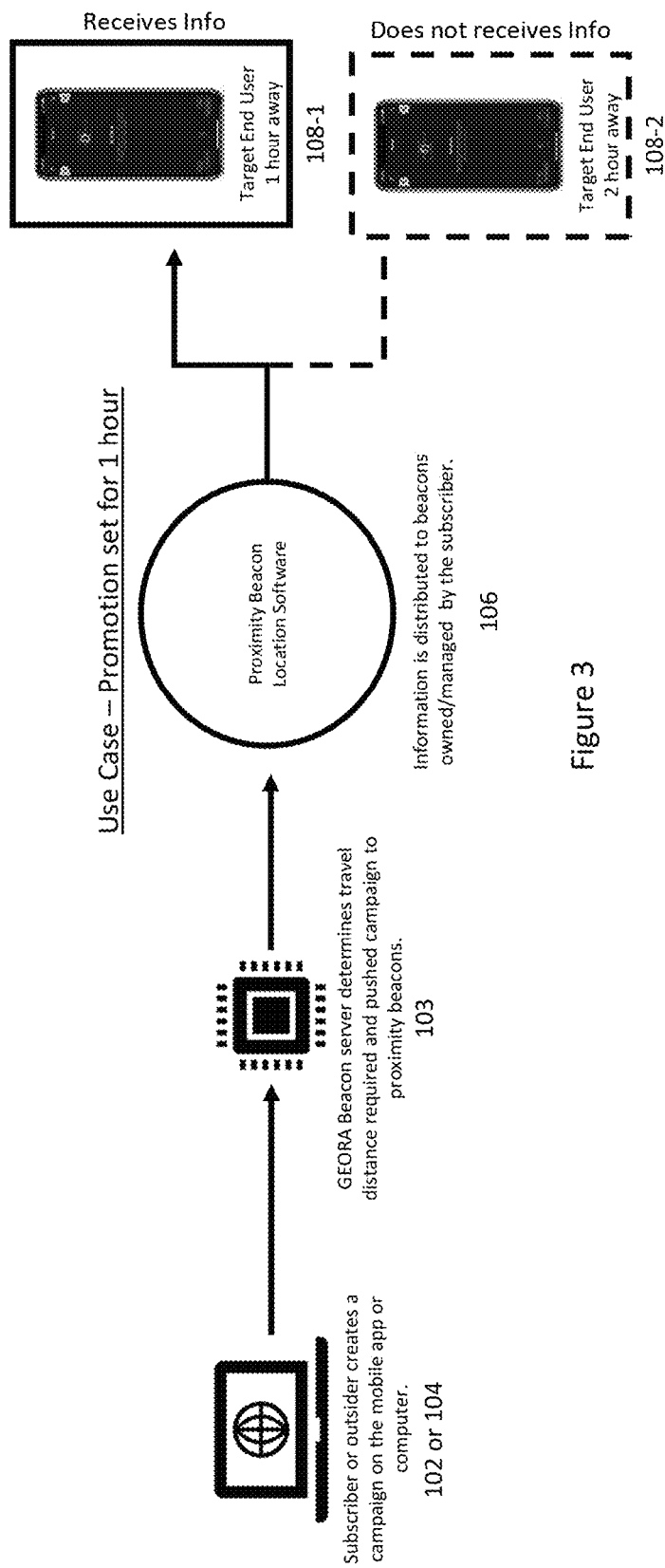
FIG. 3 illustrates timed distribution.

FIG. 3 illustrates one way to provide elapsed time or distance-based distribution of beacon messages. A beacon transmitter 106 is in a known location, such as a Nike shoe store that wishes to do a free t-shirt giveaway promotion for the next hour. The Nike store is thus a point of destination—a place where end user devices 108-1, 108-2 might travel to redeem the promotion.

The promotion will be sent out by the GEORA service 100 as described above. Here, the GEORA application may determine, from among all available beacon locations, which beacons are located within a one hour driving radius of the Nike store. The time-based promotion then will only be distributed to those beacons that are within that range and thus only target devices 108 that are an hour away. Thus, target device 108-1 receives the promotion, but not target device 108-2 which is two hours away.

In one implementation, the user 101 (be they an internal or an outside user) may be enabled by the GEORA application to identify which particular beacons within range are enabled to distribute time-based promotions.

In another example, the promotion may be quantity-limited. Say the point of destination Nike store only has 12 t-shirts available. When the user 101 creates a campaign, they also specify a quantity. When that quantity has been reached, no matter how many end users 109 received the information, the campaign will end once the quantity has been reached. So, for instance, once 12 end users have interacted with the beacon message to indicate they're coming, that information is fed back to the GEORA service 100, and the promotion will then be immediately withdrawn from the associated beacons 106, so that it won't be distributed to any additional mobile devices.

Thus, a campaign may still be activated based on travel time (distance), but restricted based on quantity such that it won't be active anymore one the quantity has been reached. In this way, messages that are no longer operable or relevant are prohibited from reaching the end user devices.

In some cases, the target user application 144 on the target device 108 may be enabled to have three types of interactions with received beacon messages. They may enable the target user 109 for example to select "save till later". They may have a "delete or to archive" option, or they may have an interaction which indicates acceptance of a promotion. This information is returned to the GEORA server 103 to control further message distribution.

Another consideration for distance-based promotions is as follows. A 30 minute promotion might be initially pushed out to all beacons 106 within a one hour radius as explained above. However, those messages are pulled from the respective beacon transmission as the time remaining counts down. So if a beacon transmitter 106 is located 29 minutes away from the point of destination, that beacon message will only be broadcast for 31 minutes. A beacon transmitter 106 located 10 minutes away from the point of destination would transmit for 50 minutes, and so forth. In other words, beacon messages sent by the GEORA service may also have a time based parameter, and that time parameter can be optionally chosen to shrink as the travel radius from the destination point increases.

Other beacons 106 may be strictly time-limited, such as when the promotion doesn't require travel but is based on time. One example might be a fund raiser. The end user 109 doesn't necessarily need to travel to a defined location to participate in the fundraiser, but it may be limited to time.

Figure 4:
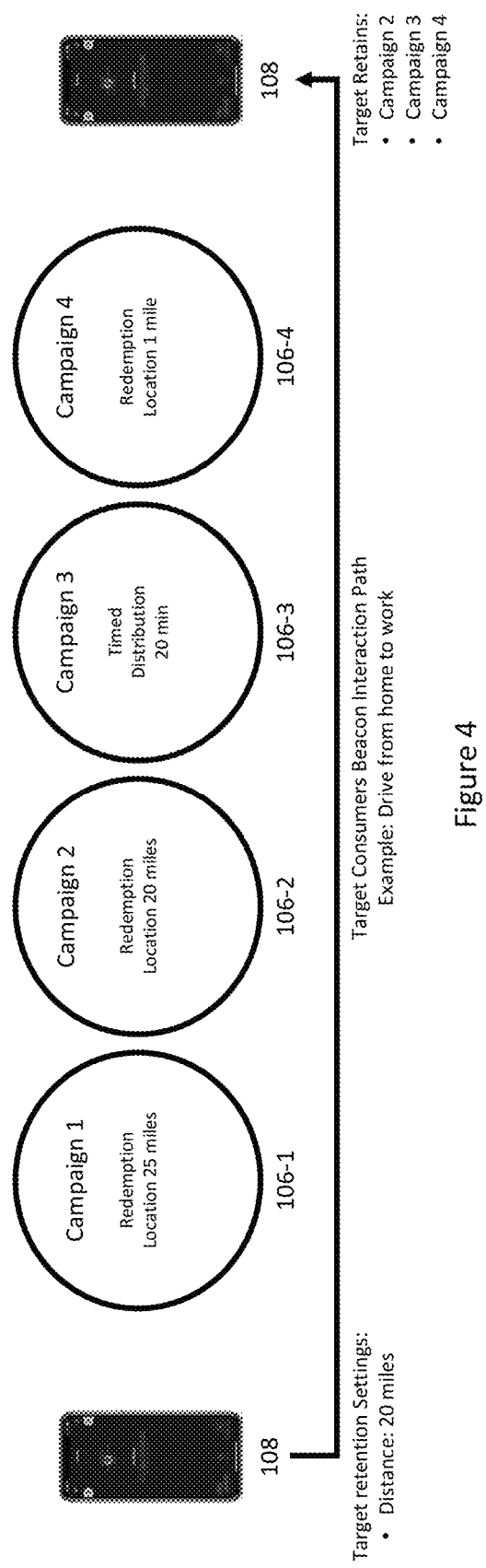
FIG. 4 shows information retention.

FIG. 4 shows how the GEORA service 100 also supports a concept of retained information concerning beacon messages. In this example there are both time-limited and distance-based beacons being used. As a target device 108 travels from left to right in FIG. 4, they encounter different beacons 106-1, . . . , 106-4 in a sequence. Different campaigns in progress are based on the distance travelled by the target device (e.g., 25 miles or 20 miles or 1 mile) or travel time-based (20 minutes). As the target user starts to travel from left to right, the beacons are retained (or not) such as by the target user application 144 running in the end user's device. So when reaching the location on the right side, the device 108 retains only selected ones of the campaigns received from beacons 106-2, 106-3 and 106-4, but not those received from beacon 106-1 since they have now travelled beyond the 25 mile retention distance. As the end user device 108 travels further to the right, the message received from beacon 106-2 will no longer be retained, etc.

Figure 5:
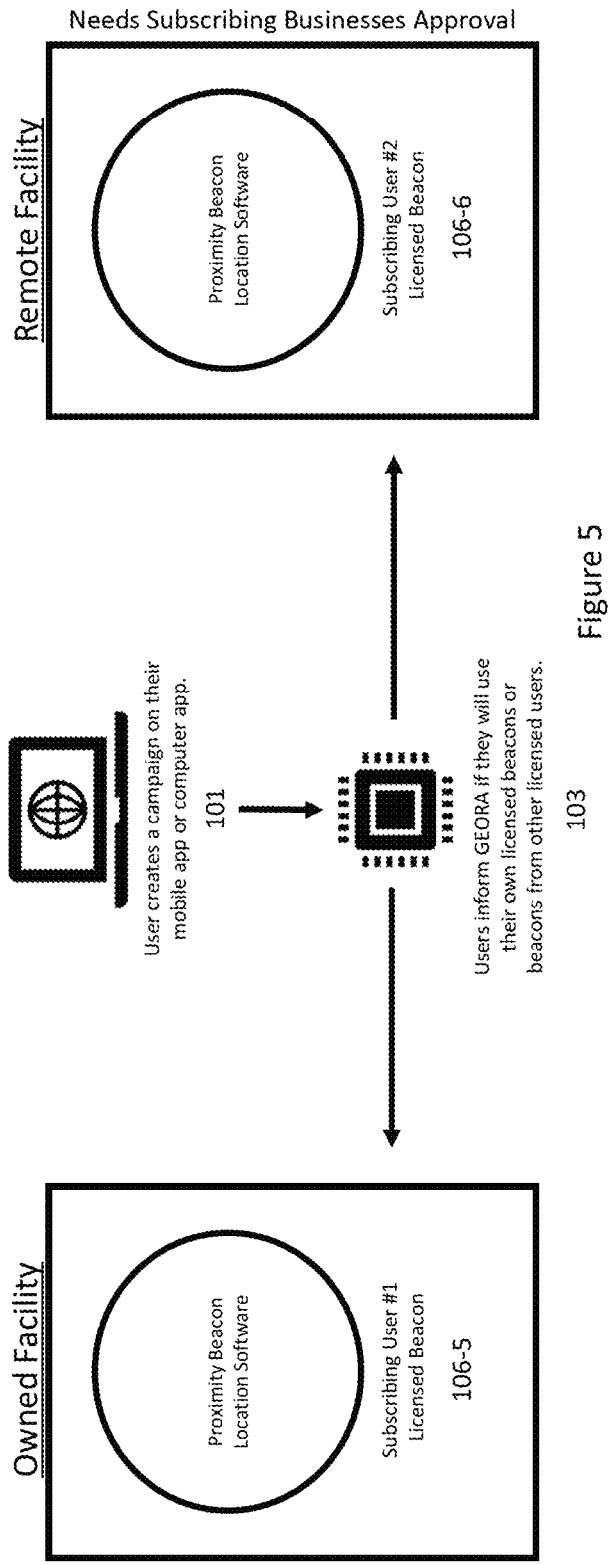
FIG. 5 illustrates one way to distribute to owned and remote (unowned) facilities.

FIG. 5 shows another situation, where a retail business or other enterprise that owns and manages their own beacons can promote campaigns on an unlimited basis from one or more of the beacons 160-5 located at facilities they own or lease. But they can also choose to market campaigns to beacons 106-6 location at somebody else's facility which is remote to them. Similar to the process described for an outside user above, they make a "shared access" or remote request to the GEORA service 100 as an outsider user 101, and request permission to promote those beacons 106-6 owned by other businesses that they do not manage. The GEORA service 100 may impose subscription pricing in this instance to permit access to the different, remote, "owned by another enterprise" facility.

Figure 6:
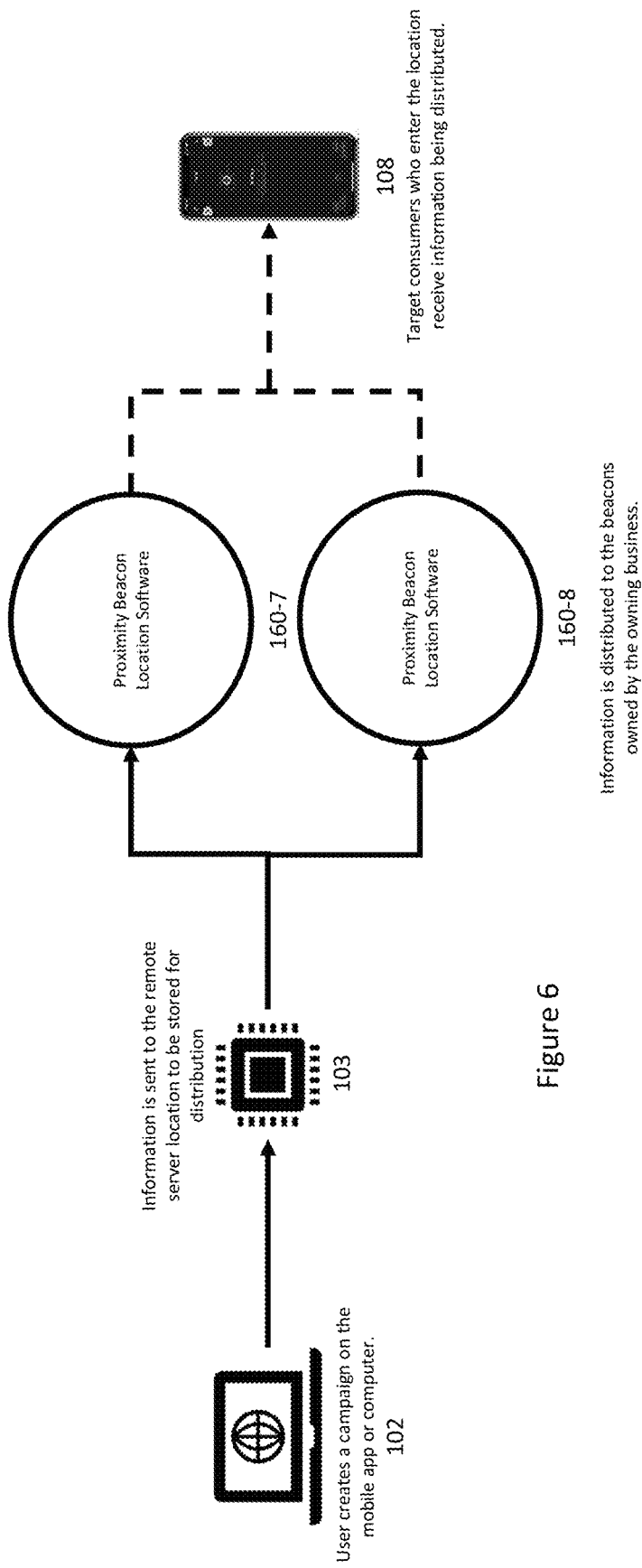
FIG. 6 illustrates distribution to multiple sites.

FIG. 6 is a more detailed example where the campaign is being pushed by the GEORA service 100 to multiple beacon transmitters 106-7, 106-8 at a given location.

Figure 7:
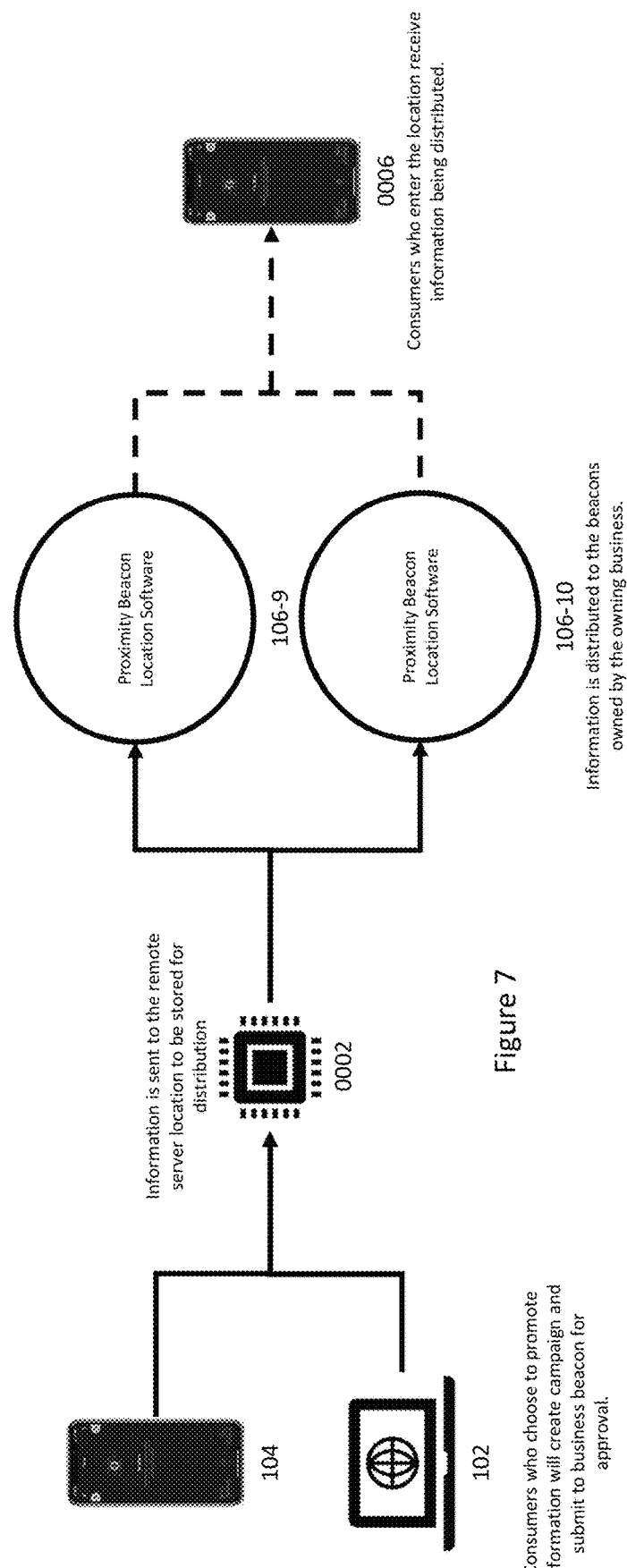
FIG. 7 is another way to distribute to multiple sites.

FIG. 7 is similar to FIG. 6, showing that even in a shared access beacon network, there may be more than one beacon 106-9, 106-10 located at a given site.

Figure 8:
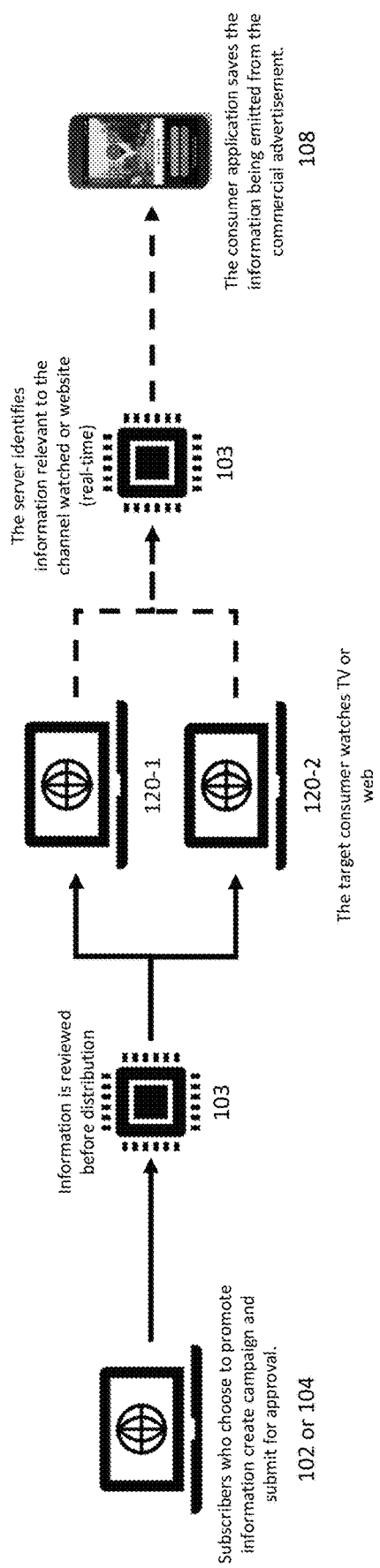
FIG. 8 shows distribution via a television or other media network.

FIG. 8 illustrates another type of beacon message retention, based on retention of Internet streaming audio or video or digital television broadcasts. Here a broadcast transmission device 120-1, such as a cable box, smart TV, streaming media device (Roku, Apple TV, Firestick, Chromecast etc.), or a computing device 120-1 via a browser or mobile app is playing a television show, program or movie distributed via a television network, Netflix, Hulu, YouTube, podcast, or other broadcast service. In this scenario, the GEORA application 144 running on the end user device 108 identifies which channel (or other streaming media) the target consumer 109 is watching (or listening to), and forwards that information to the GEORA service 100 (such as via the mobile device's WiFi or other data connection).

The reception devices 120-1, 120-2 in effect, can become another beacon transmitter that augments and extends the beacon networks described above. In effect, the GEORA service 100 can provide "broadcast network"—augmented beacon promotion. In one example, the broadcast media source (be it a TV network, or other media network such as Netflix) creates codes for the commercials that they show throughout the day. Those codes are also provided to the GEORA server 103 and distributed to the target device 108 application 144. With that information in hand, and the information from the target devices 108, the GEORA server can now track which commercials were seen by the target device 108. This information can then be retained and counted in much the same way that messages distributed via the beacons were tracked. Thus, as the end user watches TV or streaming media, the information being emitted from the "broadcast transponder" can matched to a campaign created on the GEORA server, and matched for example, when the end user interacts with a beacon such as shown in the other figures, e.g., walks into a retail establishment associated with a beacon owner.

The various computing systems described herein, such as the user devices 102, 104, and 108, the servers 103, and beacons 106 include are data processors. The server(s) 103 include one or more hardware CPU ("central processing unit") computer processors, various I/O ("input/output") hardware components, storage, and memory. The illustrated I/O components may include a display, a network connection, a computer-readable media drive, and other I/O devices (e.g., a keyboard, a mouse, touchscreen, speakers, etc.). In addition, the illustrated inside, outside, and end user computer systems may each have components similar to those of server 103, including one or more CPUs, I/O components, storage, and memory.

The GEORA server components described above execute in memory and in some embodiments the system and/or components each includes various software instructions that when executed program one or more of the CPU processors to provide an embodiment of the GEORA service as described elsewhere herein.

The components described herein may interact over one or more networks (e.g., via the Internet and/or the World Wide Web, via a private cellular or wireless network, etc.). Certain of the computing systems may also be executing various software as part of interactions with the GEORA server 103 and/or its components. For example, the inside, outside and end user computing devices may be executing software in memory to interact with GEORA server 103 (e.g., as part of a Web browser, a specialized client-side application program, cloud computing service, etc.), such as to interact with one or more interfaces to configure and deploy the functions described herein. Various information related to the functionality of the GEORA service may be stored in storage, such as information related to individual inside, outside or end users.

It will be appreciated that computing systems and devices are merely illustrative and are not intended to limit the scope of the present invention. The computing systems may instead each include multiple interacting computing systems or devices, and the computing systems/nodes may be connected to other devices that are not illustrated, including through one or more networks such as the Internet, via the Web, or via private networks (e.g., mobile communication networks, etc.). More generally, a computing node or other computing system or device may comprise any combination of hardware that may interact and perform the described types of functionality, including without limitation desktop or other computers, database servers, network storage devices and other network devices, PDAs, cell phones, wireless phones, pagers, electronic organizers, Internet appliances, television-based systems (e.g., using set-top boxes and/or personal/digital video recorders), and various other consumer products that include appropriate communication capabilities. In addition, the functionality provided by the illustrated GEORA service and its components may in some embodiments be distributed in additional components such as cloud computing services, virtual machines and the like. Similarly, in some embodiments some of the functionality may not be provided and/or other additional functionality may be available.

It will also be appreciated that, while various items are illustrated as being stored in memory or on storage while being used, these items or portions of them may be transferred between memory and other storage devices for purposes of memory management and data integrity. Alternatively, in other embodiments some or all of the software modules and/or systems may execute in memory on another device and communicate with the illustrated computing systems via inter-computer communication. Thus, in some embodiments, some or all of the described techniques may be performed by hardware means that include one or more processors and/or memory and/or storage when configured by one or more software programs (e.g., by the GEORA server(s) 103 and/or the internal, outside, or end user devices and/or data structures, such as by execution of software instructions of the one or more software programs and/or by storage of such software instructions and/or data structures. Furthermore, in some embodiments, some or all of the systems and/or components may be implemented or provided in other manners, such as by using means that are implemented at least partially or completely in firmware and/or hardware, including, but not limited to, one or more application-specific integrated circuits (ASICs), standard integrated circuits, controllers (e.g., by executing appropriate instructions, and including microcontrollers and/or embedded controllers), field-programmable gate arrays (FPGAs), complex programmable logic devices (CPLDs), etc. Some or all of the components, systems and data structures may also be stored (e.g., as software instructions or structured data) on a non-transitory computer-readable storage medium, such as a hard disk or flash drive or other non-volatile storage device, volatile or non-volatile memory (e.g., RAM), a network storage device, or a portable media article to be read by an appropriate drive (e.g., a DVD disk, a CD disk, an optical disk, etc.) or via an appropriate connection. The systems, components and data structures may also in some embodiments be transmitted as generated data signals (e.g., as part of a carrier wave or other analog or digital propagated signal) on a variety of computer-readable transmission mediums, including wireless-based and wired/cable-based mediums, and may take a variety of forms (e.g., as part of a single or multiplexed analog signal, or as multiple discrete digital packets or frames). Such computer program products may also take other forms in other embodiments. Accordingly, the present invention may be practiced with other computer system configurations.

While the above has particularly shown and described example embodiments, it will be understood by those skilled in the art that various changes in form and details may be made therein without departing from the scope of the invention as encompassed only by the appended claims.

The invention claimed is:

1. A computer-implemented method comprising:
receiving, by a beacon server from a user device, a specification for one or more beacon messages to be sent to two or more beacon transmitters, the specification including at least content for the one or more beacon messages and a specification for where the messages are to be sent;

determining one or more beacon transmitters to receive the one or more beacon messages based on the specification for where the messages are to be sent;

identifying a beacon manager entity for the so determined one or more of the beacon transmitters;

determining whether the user device is an insider user device associated with the beacon manager entity or an outsider user device;

when the user device is an insider user device, forwarding the one or more beacon messages to the beacon transmitters to be sent in turn to end user devices, without obtaining permission from an administrative user associated with the beacon manager entity;

when the user device is an outside user device, forwarding the one or more beacon messages to the beacon transmitters to be sent in turn to end user devices, only after obtaining permission from the administrative user associated with the beacon manager entity;

wherein the beacon messages relate to a determined physical location;

wherein the specification for where the beacon messages are to be sent determines which respective beacon transmitters receive the one or more beacon messages depending on a distance between the determined physical location and each of the respective beacon transmitters;

such that at least one of the beacon transmitters does not receive at least one beacon message and such that at least one of the beacon transmitters does receive at least one beacon message; and transmitting selected ones of the beacon messages only for an elapsed time; and wherein the elapsed time associated with the selected ones of the beacon messages depends on a time to travel between the determined physical location and the respective beacon transmitter from which the selected beacon message is transmitted.

2. The method of claim 1 wherein the one or more beacon transmitters include one or more Bluetooth LE, iBeacon, or Eddystone beacon transmitters.

3. The method of claim 1 wherein the beacon manager entity owns or controls physical access to transmit using the one or more beacons.

4. The method of claim 1 wherein the inside user is employed by, working with, or otherwise authorized by beacon manager entity.

5. The method of claim 1 wherein the outside user is other than a person who is employed by or working with the beacon manager entity.

6. The method of claim 1 where the one or more beacons further comprise:

physical area beacons, configured for transmitting information associated with a physical area.

* * * * *